(12) United States Patent
Smith

(10) Patent No.: US 9,898,737 B2
(45) Date of Patent: *Feb. 20, 2018

(54) METHODS AND SYSTEMS EMPLOYING TIME AND/OR LOCATION DATA FOR USE IN TRANSACTIONS

(71) Applicant: Honeywell International, Inc., Morristown, NJ (US)

(72) Inventor: Taylor M. Smith, Charlotte, NC (US)

(73) Assignee: Honeywell International, Inc., Morristown, NJ (US)

( * ) Notice: Subject to any disclaimer, the term of this patent is extended or adjusted under 35 U.S.C. 154(b) by 78 days.

This patent is subject to a terminal disclaimer.

(21) Appl. No.: 14/526,564

(22) Filed: Oct. 29, 2014

(65) Prior Publication Data

US 2015/0051992 A1 Feb. 19, 2015

Related U.S. Application Data

(63) Continuation of application No. 13/360,917, filed on Jan. 30, 2012, now Pat. No. 8,880,426.

(51) Int. Cl.
*G06Q 20/38* (2012.01)
*G06Q 20/32* (2012.01)
(Continued)

(52) U.S. Cl.
CPC ....... *G06Q 20/38* (2013.01); *G06K 19/06112* (2013.01); *G06Q 20/08* (2013.01); *G06Q 20/20* (2013.01); *G06Q 20/202* (2013.01); *G06Q 20/3224* (2013.01); *G06Q 20/3276* (2013.01); *G06Q 20/3278* (2013.01)

(58) Field of Classification Search
None
See application file for complete search history.

(56) References Cited

U.S. PATENT DOCUMENTS

| 5,091,634 A | 2/1992 | Finch et al. |
| 5,369,262 A | 11/1994 | Dvorkis et al. |
| (Continued) | | |

OTHER PUBLICATIONS

U.S. Appl. No. 12/966,543, filed Dec. 13, 2010.
Dolphin 99EX Mobile Computer User's Guide, manufactured by Honeywell Scanning & Mobility, pp. 1-194.

*Primary Examiner* — Shay S Glass
(74) *Attorney, Agent, or Firm* — Additon, Higgins & Pendleton, P.A.

(57) ABSTRACT

A method includes obtaining data from a portable electronic device in which the data regards information obtained using the portable electronic regarding the transaction, and information obtained using the portable electronic regarding at least one of a physical location of the portable electronic device when obtaining the information regarding the transaction and the time of the day when obtaining the information regarding the transaction, and processing the transaction based on the data regarding the information regarding the transaction and the at least one of the information regarding the physical location of the portable electronic device when obtaining the information regarding the transaction and the time of the day when obtaining the information regarding the transaction. The method may be employed in a point-of-sale transaction for the purchase of products at checkout.

13 Claims, 5 Drawing Sheets

(51) Int. Cl.
  *G06Q 20/20*  (2012.01)
  *G06K 19/06*  (2006.01)
  *G06Q 20/08*  (2012.01)

(56) References Cited

U.S. PATENT DOCUMENTS

| | | |
|---|---|---|
| 5,640,002 A | 6/1997 | Ruppert et al. |
| 5,710,728 A | 1/1998 | Danielson et al. |
| 6,572,019 B1 | 6/2003 | Rando et al. |
| 7,555,444 B1 * | 6/2009 | Wilson ............ G06Q 30/02 705/14.41 |
| 7,631,810 B2 | 12/2009 | Liu et al. |
| 7,712,670 B2 | 5/2010 | Sauerwein, Jr. et al. |
| 7,774,283 B2 | 8/2010 | Das et al. |
| 7,909,243 B2 | 3/2011 | Merkow et al. |
| 8,032,414 B2 * | 10/2011 | Payne ............ G06Q 20/20 235/381 |
| 8,880,426 B2 | 11/2014 | Smith |
| 2008/0236906 A1 | 10/2008 | Foo et al. |
| 2009/0026267 A1 | 1/2009 | Wang |
| 2010/0217723 A1 | 8/2010 | Sauerwein, Jr. et al. |
| 2010/0231557 A1 | 9/2010 | Wang |
| 2010/0252337 A1 | 10/2010 | Yang |
| 2012/0146913 A1 | 6/2012 | Linn |

\* cited by examiner

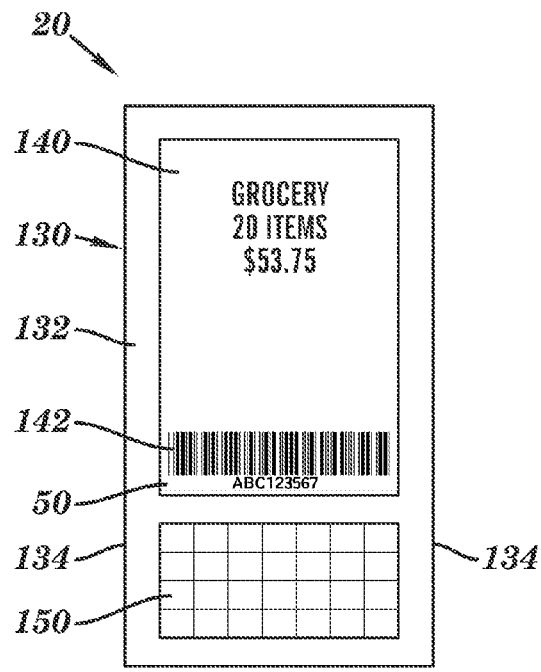
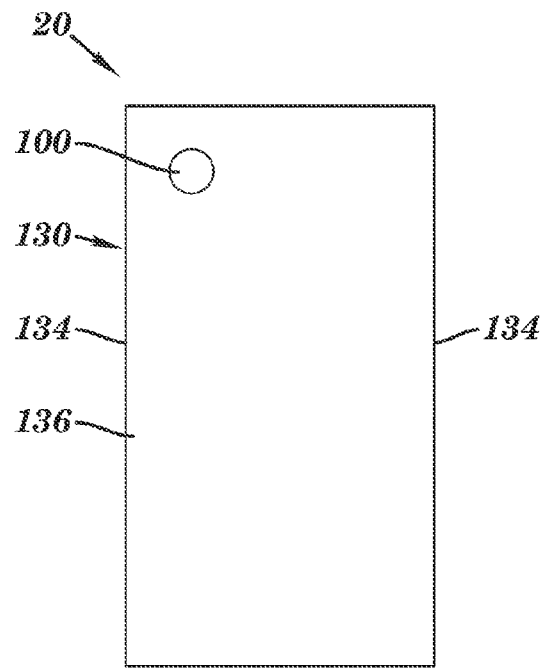
FIG. 2  FIG. 3
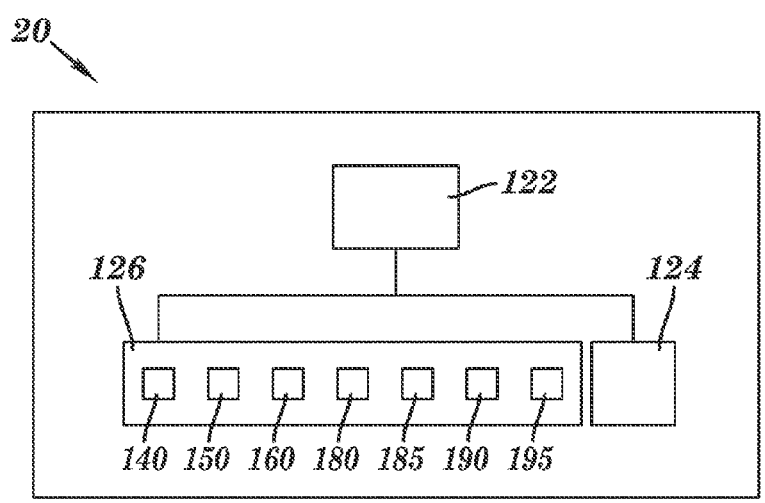
FIG. 4

METHODS AND SYSTEMS EMPLOYING TIME AND/OR LOCATION DATA FOR USE IN TRANSACTIONS

CROSS-REFERENCE TO RELATED APPLICATION

The present application claims the benefit of U.S. patent application Ser. No. 13/360,917 for Methods and Systems Employing Time and/or Location Data for use in Transactions filed Jan. 30, 2012 (and published Aug. 1, 2013 as U.S. Patent Application Publication No. 2013/0198019), now U.S. Pat. No. 8,880,426. Each of the foregoing patent application, patent publication, and patent is hereby incorporated by reference in its entirety.

FIELD OF THE INVENTION

This invention relates generally to methods and systems for use in transactions, and more specifically, to methods and systems employing time and/or location data for use in transactions such as decodable optical indicia having encoded time and location data for use in point-of-sale transactions.

BACKGROUND

U.S. Pat. No. 7,909,243 issued to Merkow et al. discloses a system and method for completing a financial transaction using a wireless communication device such as a mobile telephone. A transaction authorization request is sent from the device to an issuer using short message service. An authentication message is sent from the issuer to the device, and a response is sent by a user of the device to confirm the identity of the user. Once the identity of the user is verified, a surrogate account number, in a barcode format, is sent to the mobile communication device to be read by a point-of-sale device to complete the financial transaction. A computer program product enabling the systems and methods described is also provided. Preferably, the surrogate account number is unique to the particular transaction. For example, adding an expiry date and time can make each surrogate account number unique.

U.S. Pat. No. 5,640,002 issued to Ruppert et al. disclose a portable RFID tag and barcode reader that gathers information about items to be purchased etc. by reading barcodes or RFID tags. A store host computer gathers information about items to be purchased from the portable barcode/ID tag readers and then the items are bagged by the customer at the checkout stand or by employees of the store at the checkout stand or in a separate warehouse from which the customer picks up the order. The portable barcode/RFID tag reader can also be used in authenticating articles by accessing a factory computer using a serial number for the article scanned from an RFID tag on the article.

There is a need for methods and systems for use in transactions, and more specifically, to methods and systems employing time and/or location data for use in transactions such as decodable optical indicia having encoded time and location data for use in point-of-sale transactions.

SUMMARY

In a first aspect, the present invention provides a method for use in processing a transaction. The method includes obtaining data from a portable electronic device. The data includes information obtained using the portable electronic device regarding the transaction, and information obtained using the portable electronic device regarding at least one of a physical location of the portable electronic device when obtaining the information regarding the transaction and a time of the day when obtaining the information regarding the transaction. The transaction is processed based on the data regarding the information regarding the transaction and the at least one of the information regarding the physical location of the portable electronic device when obtaining the information regarding the transaction and the time of the day when obtaining the information regarding the transaction.

In a second aspect, the present invention provides a method for use in processing a transaction. The method includes obtaining information, using a portable electronic device, regarding the transaction and at least one of a physical location of the portable electronic device when obtaining the information regarding the transaction and a time of the day when obtaining the information regarding the transaction. The data is provided, using the portable electronic device, regarding the information regarding the transaction and the at least one of the information regarding the physical location of the portable electronic device when obtaining the information regarding the transaction and the time of the day when obtaining the information regarding the transaction for use in processing the transaction.

In a third aspect, the present invention provides a system for processing a transaction. The system includes means for obtaining, from a portable electronic device, data regarding information obtained using the portable electronic regarding the transaction, and information obtained using the portable electronic regarding at least one of a physical location of the portable electronic device when obtaining the information regarding the transaction and a time of the day when obtaining the information regarding the transaction, and means for processing the transaction based on the data regarding the information regarding the transaction and the at least one of the information regarding the physical location of the portable electronic device when obtaining the information regarding the transaction and the time of the day when obtaining the information regarding the transaction.

In a fourth aspect, the present invention provides a portable electronic device for use in processing a transaction. The portable electronic device includes means for obtaining information regarding the transaction, means for obtaining information regarding at least one of a physical location of the portable electronic device when obtaining the information regarding the transaction, and a time of the day when obtaining the information regarding the transaction, and means for providing data regarding the information regarding the transaction and the at least one of the information regarding the physical location of the portable electronic device when obtaining the information regarding the transaction and the time of the day when obtaining the information regarding the transaction for use in processing the transaction.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of various embodiments and the accompanying drawings in which:

FIG. 2 is a front side elevational view of one embodiment of a portable electronic device of FIG. 1 having a display in accordance with aspects of the present invention;

FIG. 3 is a rear side elevational view of the portable electronic device of FIG. 2;

FIG. 4 is a block diagram of the portable electronic device of FIGS. 2 and 3;

DETAILED DESCRIPTION

Figure 1:
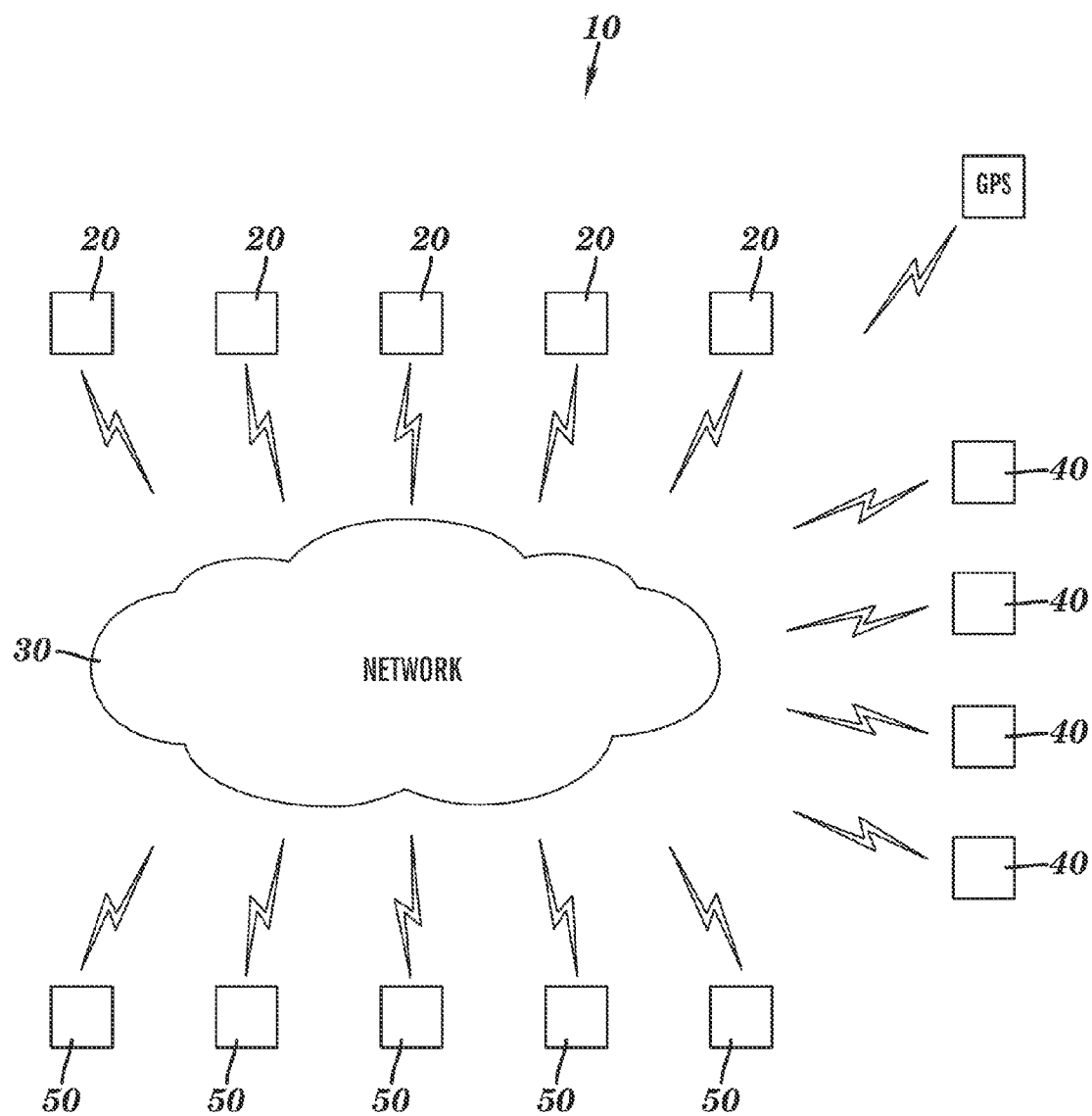
FIG. 1 is a block diagram of one embodiment of a network system for use in processing transactions in accordance with aspects of the present invention.

As described in greater detail below, the present invention is generally directed to methods and systems for use in conjunction with transactions. For example, the methods and systems may employ obtaining location coordinates and/or a date/time stamp regarding a transaction, which obtained location coordinates and date/time stamp are used in processing the transaction.

For example, in one embodiment, the present invention may be directed to methods and systems for use in conjunction with point-of-sale transactions. In one aspect, a portable electronic device may be employed for paying for the purchase of a plurality of items in a store such as for purchase of a plurality of grocery items in a supermarket. In another aspect, a point-of-sale terminal may be employed by a merchant for reading the portable electronic device and accept or deny payment for the purchase of products. For example, a customer may scan products such as optically scanning or scanning radio-frequency identification (RFID) tags associated with one or more products using a portable electronic device and then place them in a basket for purchase. When finished shopping, the customer may operate the portable electronic device to generate an optical scannable indicia such as a barcode for display on the portable electronic device or transmit a wireless transmission such as a near field communication (NFC) from the portable electronic device based on the items to be purchased, a bank account for payment, and a location and/or a time of the day for generating the optical scannable decodable indicia. The point-of-sale transaction system may use the data regarding the location and the time of day in an effort to reduce the likelihood of customer fraud in purchasing the products.

In addition, in other embodiments, the present invention may be implemented for issuing and accepting coupons, or implemented in a guard tour patrol system for logging the rounds of employees in a variety of situations.

Reference is made in detail to aspects of the present invention, examples of which are illustrated in the accompanying drawings, wherein like reference numerals refer to like elements throughout. The following description will use nomenclature associated with portable electronic devices, however those of ordinary skill in the art will recognize that the present invention is applicable to a variety of portable electronic devices such as cell phones, mobile phones, Smartphones, satellite phones, telemetric devices, personal data assistants (PDAs), tablets, and other portable and hand held devices. The following description will also use nomenclature associated with transaction systems, however those of ordinary skill in the art will recognize that the present invention is applicable to a variety of transaction systems such as point-of-sale terminals and cash registers having fixed or portable readers.

FIG. 1 illustrates a block diagram of one embodiment of network system 10 for use in point-of-sale transactions in accordance with aspects of the present invention. In this illustrated embodiment, a plurality of portable electronic devices 20 such as cell phones, Smartphones, etc. usable by customers may be operably connected to a communication network 30 such as a cellular telephone network, a global network such as the Internet, or other suitable networks, for communicating with a plurality of financial entities 40 such as credit card networks, banks, shared bank networks, and/or other suitable means for settlement of transactions. In addition, network system 10 may include a plurality of point-of-sale transaction systems 50 such as a plurality of point-of-sale terminals, cash registers, and operably connected to communication network 30. For example, in a store, a plurality of point-of-sale terminals or cash registers may include fixed or portable readers that may be operably connected to a store controller, which store controller is connected to communication network 30. The communication between portable electronic devices 20 and communication network 30 is preferably a wireless communication. The communication between communication network 30 and the plurality of point-of-sale transaction systems 50 may be a wireless communication or a non-wireless communication.

Portable electronic devices 20 may be operable for obtaining data from an external positioning system. For example, the portable electronic devices may be operable for obtaining data from a Global Positioning System (GPS), or a cellular telephone network for determining the location of the portable electronic device as described below. In addition, the portable electronic devices may employ wireless local area network (WLAN) based positioning using WLAN access points (such as in the store) based on WiFi signals to determine the location of the portable electronic devices. The approximate range to an access point can be determined by measuring the power level of the WiFi beacon transmission, since signal power decreases approximately with the square of the distance. Wi-Fi Positioning System (WPS) may be combined with cell phone tower triangulation and GPS to provide reliable and accurate position data under a wide range of conditions, including among tall buildings and indoors, when GPS signals may be weak or intermittent.

FIGS. 2 and 3 illustrate one embodiment of portable electronic device 20 in accordance with aspects of the present invention. Exemplary portable electronic device 20 may include a housing 130 having a front surface 132 (FIG. 2), side surfaces 134, and a rear surface 136 (FIG. 3).

With reference to FIG. 2, portable electronic device 20 may further include a display screen 140 such as a backlit LED or LCD display for displaying optically scannable decodable indicia such as a barcode 142. The display may also be an electronic paper display such as an e-paper display, electronic ink display, and other displays that mimic the appearance of ordinary ink on paper. Unlike conventional backlit flat panel displays, electronic paper displays reflect ambient light like ordinary paper rather than emitting its own light. A keyboard 150 enabling the input of data may also be disposed on front side 132 of housing 130. In another embodiment, the display may be a backlit LED or LCD touch screen display comprising a display and a touch sensitive overlay disposed over the display. In this manner, the display screen operates as a data input interface. A camera 160 (FIG. 3) may be disposed on the backside of the housing. Housing 130 may also support a variety of components, including a battery typically located in the rear half of the body.

Display 140 may be operable to display barcode image 142 operable as an optical machine-readable representation of data. The barcode may represent data by varying the widths and spacings of parallel lines, and may be referred to as linear or 1 dimensional (1D). The barcode image may also include geometric patterns, rectangles, dots, hexagons and other geometric patterns in 2 dimensions (2D). The above-described barcodes may be provided in a file format, such as portable network graphics (PNG), joint photography experts group (JPG), tagged image file format (TIFF), bitmap (BMP) and graphics interchange format (GIF). Alternatively, the data may be raw data, and such raw data received and processed by the portable electronic device to generate the optical scannable indicia such as a barcode which is displayed on display 140.

As shown in FIG. 4, portable electronic device 20 may include, for example, a computing unit or processor 122, one or more data storage units 124 such as memory or a memory card, and one or more input/output devices 126 such as display 140, keyboard 150, camera 160, a wireless receiver 180, and a wireless transmitter 185. Portable electronic device 20 may also include a position location device 190 such as a GPS chipset for identifying its location and a real time clock 195 for identifying the current time.

Position location device 190 may be, in one embodiment, operable to receive signals from a series of satellites which may be satellites of a Global Positioning System (GPS). For example, each satellite may include an atomic clock and reports time-stamped signals to position location device 190. With a timing system that includes atomic clocks in each orbiting satellite, position location device 190 may determine a distance from position location device 190 to a transmitting satellite. When position location device 190 receives signals from three of satellite, position location device 190 may determine a location (x,y coordinates) of portable electronic device 20. In determining a location of portable electronic device 20, position location device 190 may determine its present distance from each of three satellites and extracts location information utilizing triangulation. Portable electronic device 20 may alternatively determine the physical location and time operably using a cellular network. Suitable position locating devices and units include GPS, cellular systems, and other systems are disclosed in U.S. Patent Application Publication No. 2010/0217723 by Sauerwein, Jr. et al., the entire contents of which are incorporated herein by reference.

Figure 5:
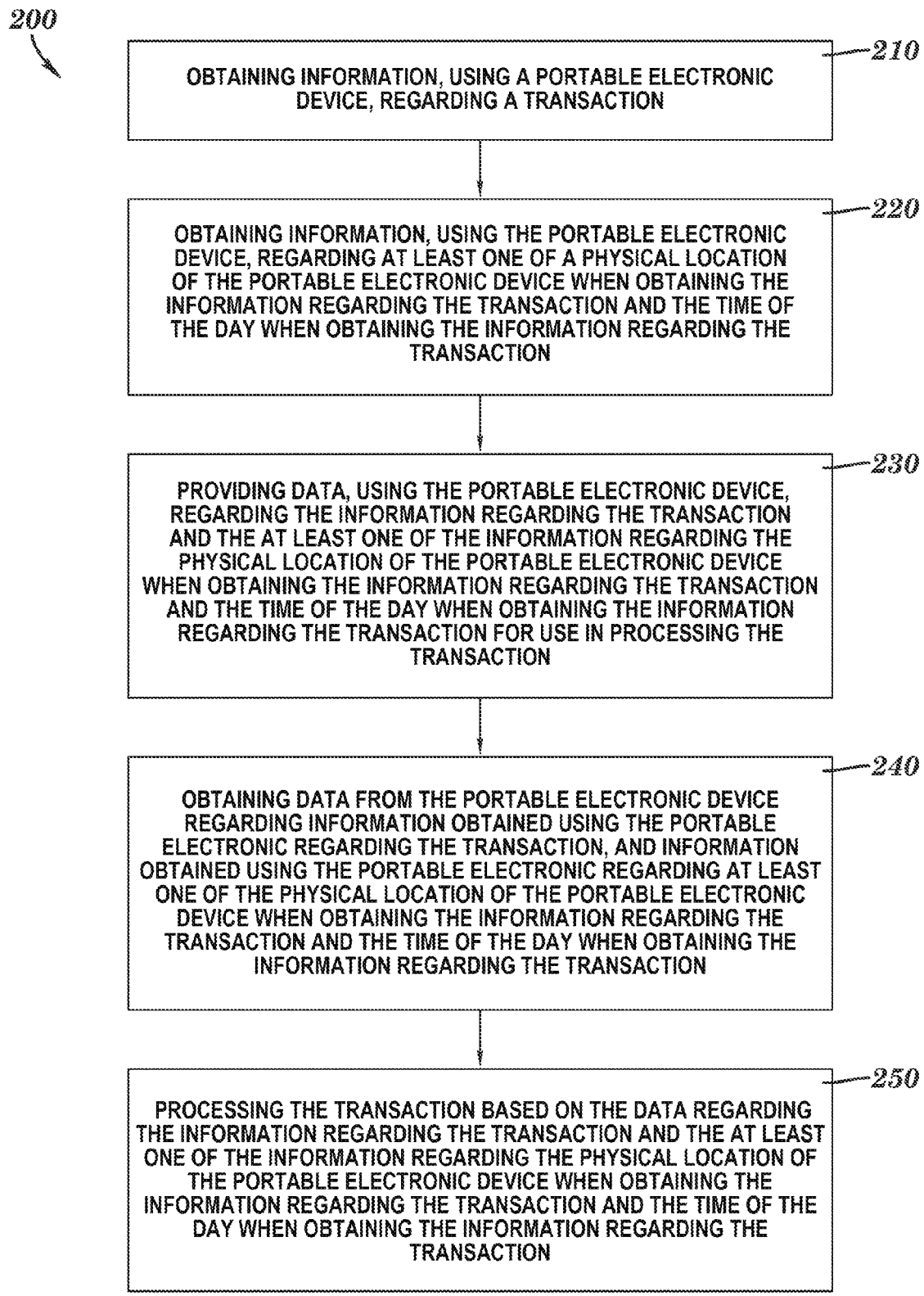
FIG. 5 illustrates a flowchart of one embodiment of a method for processing a transaction using the portable electronic device and the transaction system of FIG. 1 in accordance with aspects of the present invention.

FIG. 5 illustrates a flowchart of one embodiment of a method 200 for processing a transaction in accordance with aspects of the present invention. For example, the method may include at 210, obtaining information, using a portable electronic device, regarding a transaction, and a 220, obtaining information, using the portable electronic device, regarding at least one of a physical location of the portable electronic device when obtaining the information regarding the transaction and a current time of the day when obtaining the information regarding the transaction. At 230, data may be provided, using the portable electronic device, regarding the information regarding the transaction and the at least one of the information regarding the physical location of the portable electronic device when obtaining the information regarding the transaction and the time of the day when obtaining the information regarding the transaction for use in processing the transaction. At 240, data may be obtained from the portable electronic device regarding information obtained using the portable electronic regarding the transaction, and information obtained using the portable electronic regarding at least one of the physical location of the portable electronic device when obtaining the information regarding the transaction and the time of the day when obtaining the information regarding the transaction. At 250, the transaction is processed based on the data regarding the information regarding the transaction and the at least one of the information regarding the physical location of the portable electronic device when obtaining the information regarding the transaction and the time of the day when obtaining the information regarding the transaction.

Figure 6:
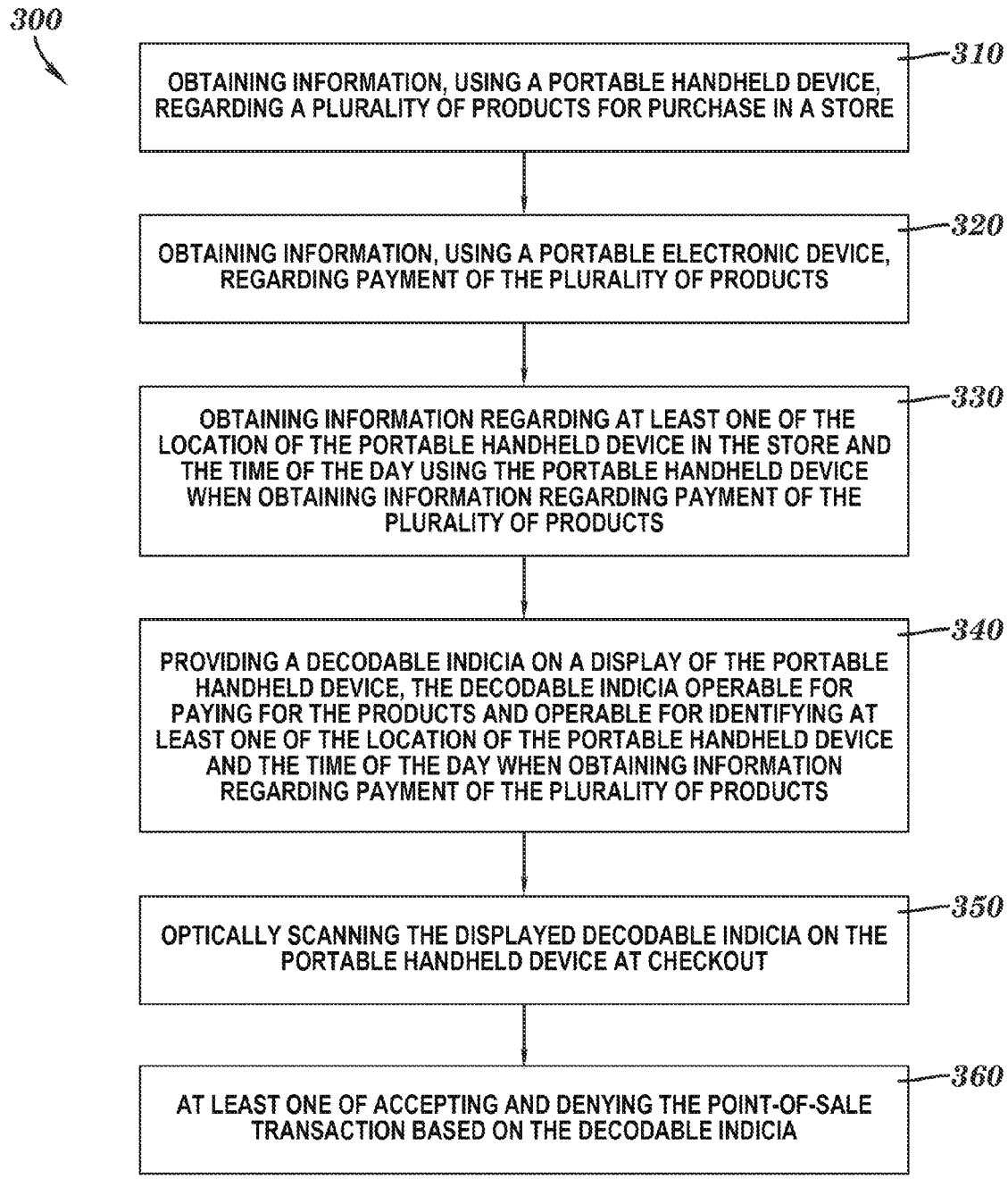
FIG. 6 illustrates a flowchart of one embodiment of a method for processing a point-of-sale transaction using the portable electronic device and the transaction system of FIG. 1 in accordance with aspects of the present invention.

FIG. 6 illustrates a flowchart of one embodiment of a method 300 for processing a point-of-sale transaction such as the purchase of a plurality of products in a store in accordance with aspects of the present invention. At 310, a customer may receive information about a plurality of products for purchase in a store using a portable electronic device prior to placing them in their basket. For example, the obtaining of information about products for purchase may include the customer optically scanning decodable indicia associated with the products, e.g., using the camera located on the portable electronic device. The obtaining of information about products for purchase may also include the customer using the portable electronic device to interrogate an RFID (radio-frequency identification) tags associated with the products.

After completing shopping, at 320, the customer may activate the portable electronic device to receive information regarding the purchase of the plurality of products such as information regarding a financial account, e.g., credit card information or bank account information. The financial account information may be stored on the portable electronic device or may be accessible via the network. At 330, information regarding at least one of the physical location of the portable handheld device in the store and a time of the day is obtained when obtaining the information regarding the purchase of the plurality of products and/or accessing the financial account information.

At 340, a decodable indicia such as an optically scannable barcode is provided on a display of the portable handheld device. The decodable indicia is operable for paying for the products and operable for identifying at least one of the location of the portable handheld device and the time of the day when obtaining information regarding payment of the plurality of products.

Figure 7:
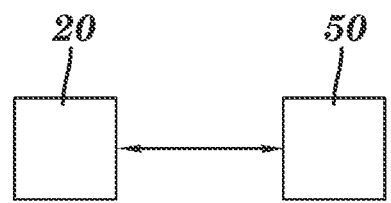
FIG. 7 is a diagrammatic illustration of one of the portable electronic devices and one of the transaction systems of FIG. 1.

At 350, the decodable indicia may be presented at a checkout for scanning (for example, portable electronic device 20 may be presented to point-of-sale transaction system 50 as shown in FIG. 7), and at 360, acceptance or denial of the point-of sale transaction may be made based on the decodable indicia. Alternatively, instead of the optical decodable indicia, the portable electronic device may transmit a wireless transmission such as a near field communication (NFC).

Figure 8:
FIG. 8 is an illustration of a decodable indicia for use in the system of FIG. 1 having portions of the decodable indicia associated with data regarding the transaction, and a location of the portable electronic device and a time when obtaining the information regarding the transaction.

With reference to FIG. 8, a decodable indicia may be operable for identifying the current date and the time of the day when obtaining information regarding paying for the plurality of products, and operable for identifying the location of the portable electronic device when generating the decodable indicia. For example, a barcode 400 may include a first portion 440 of the barcode which identifies and may be used for authorizing payment for the products such as provide credit card or bank account information for paying for the products. A second portion 446 may identify the location of the portable electronic device when generating the decodable indicia for paying for the products. For example, the second portion may identify GPS coordinates. Third portion 448 may identify the current day and time when obtaining information regarding paying for the plurality of products. Alternatively, the barcode data may be one or more pointers to information stored, for example corresponding to data for authorizing payment for the products, corresponding to data for identifying the location of the portable electronic device when generating the decodable indicia for paying for the products, and/or corresponding to data for identifying the current day and time when obtaining information regarding paying for the plurality of products, in the point-of-sale terminal, store controller, or other server location.

Figure 9:
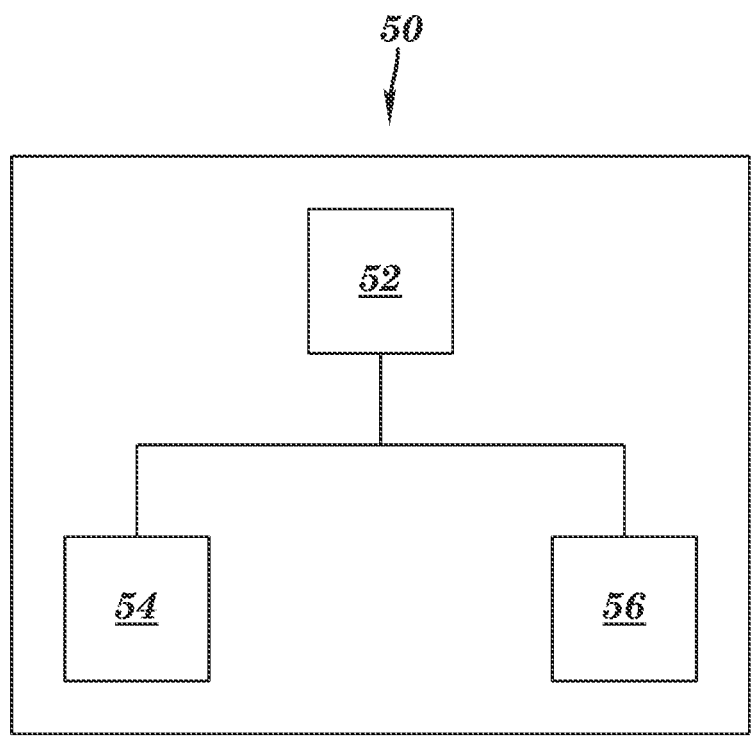
FIG. 9 is a diagrammatic illustration of one of the transaction systems of FIG. 1.

As shown in FIG. 9, transaction system 50 such as a point-of-sale transaction system may include a processor 52, memory 54, and one or more input/output devices 56. An input/output device may include a point-of-sale terminals and cash registers having fixed or portable readers. Processor 52 may be operably configured to accept or deny the transaction based on the decodable indicia identifying the time of the day when generating the decodable indicia and a current time during checkout. For example, acceptance or denial may be based on determining whether the decodable indicia or wireless transmission identifying the time of the day when generating the decodable indicia matches the time of the day at checkout, is within a predetermined time range relative to a current time during checkout, and/or prior to a predetermined time. In addition to the decodable indicia or wireless transmission identifying a time of the day, the decodable indicia or transmission may also include the calendar day, e.g., month, date, and year. Acceptance or denial may be based on the decodable indicia or wireless transmission identifying the physical location of the portable electronic device when obtaining information regarding paying for the plurality of products or generating the decodable indicia and a location or within a predetermined location during checkout. Transaction system 50 may include a position location device such as a GPS chipset, etc. (or may be programmed with its current location or a range of locations) for identifying its location and real time clock for identifying the current time From the present description, it will be appreciated that as more barcodes are being generated on mobile phones or read by Smartphones there is a concern for security and unintended proliferation of the barcodes since there is no printed medium that can be collected to take the barcodes out of circulation and prevent its reuse.

A data carrying medium, optical decodable indicia, wireless transmission, etc., may embed for example the following information:
1) GPS location coordinates;
2) Approved "tolerance" or distance radius within the defined coordinates;
3) Date/Time or Time-only;
4) Approved "tolerance" band for days and/or time of day; and/or
5) Standard data content.

The data carrying medium may be in the form of a barcode, RFID tag, optical characters, near field communication, etc., and may reduce the likelihood of reuse of the data.

Suitable processing, software, logic or algorithms may be employed in a transaction systems such as a reader/host system to accept/reject a transaction regarding the encoded protocol, modify data routing or modify data format based on the relation of the date/time and location of the code and the date/time and location of the device when scanning the code. The transaction systems may include optical scanners that incorporate the optical scanning capabilities of U.S. Patent Application Publication No. US2009/0026267 by Wang et al., the entire contents of which are incorporated herein by reference.

Application software, also known as an application or an "app", is computer software that may be downloadable to the portable electronic device such as a Smartphone and designed to allow the customer to scan the items to be purchased, obtain the current location and time, and generate and display or transmit the decodable data.

For example, in one embodiment of the process, a customer using a Smartphone for personal shopping may scan items in the store as they shop. The customer may observe the amount of the purchases as they are shopping, and when done and proceeding to the checkout, may cause the Smartphone to generate a barcode that is displayed on their screen to be scanned at checkout. This exemplary embodiment may allow for faster checkout processing times, e.g., avoid having a cashier scan each of the items at the checkout, while reducing the likelihood of fraud such as the customer adding extra items that were not scanned. The barcode may also provide identification of the customer which may be checked against a database of customers having authorization for such expedited checkout process.

Using the decodable data generated with location coordinates and a tolerance of about 100 feet (account for going to different checkout lanes) and a date/time stamp with tolerance of about 10 minutes (to account for wait time in checkout lane), the decodable barcode may not be able to be used or replicated for future use at a point-of-sale system such as an optical reader, upon scanning the code would compare its position to the location coordinates of the barcode and compare the current time to time in the barcode and only allow successful read if certain criteria is met. To further secure the barcode and prevent replication of the encoding standard, data could be encrypted so it is not obvious as to how the data content, location coordinates, and date/time are encoded. In addition, where the products contain RFID tags, the shopping cart of items to be purchased may be readily scanned without removing the items from the cart, and the total cost of the items compared to the payment amount generated by the portable electronic device and identified in the decodable indicia.

There are further applications that may be employed which incorporate aspects of the present invention in connection with embedding location coordinates and date/time stamp, and which scan, read, etc. the embedded location coordinates and date/time stamp in an optical decodable indicia, wireless transmission, etc. before processing a desired transaction.

The present invention may be implemented for issuing and accepting coupons. For example, a customer while shopping in a store may be able to receive decodable data regarding the purchase of an item, such as a coupon for an item, and wherein the decodable data may include the location, day, and/or time of day associated with obtaining the coupon as noted above. The coupon may be usable only at the store and within a limited amount of time.

The present invention may also be implemented in a guard tour patrol system for logging the rounds of employees in a variety of situations such as security guards patrolling property, technicians monitoring climate-controlled environments, and correctional officers checking prisoner living areas to ensure that the employee makes his or her appointed rounds.

For example, a portable electronic device may be operable to receive signals from an external positioning system and/or and external timing system, for example, as noted above. When an employee reaches certain points on their tour, the employee may obtain information at a checkpoint, such as optically scanning decodable indicia disposed on a placard associated with the checkpoint, interrogate an RFID tag disposed on a placard associated with the checkpoint, or receive a wireless transmission such as a near field communication (NFC) from a placard associated with the checkpoint, using the portable electronic device. The portable electronic device may log the information obtained at the checkpoint along with identifying information relating to at least one of the location of the portable electronic device, the day, and/or the time of the day when generating the log of the information obtained at the checkpoint.

Later, the information may be scanned or downloaded, e.g., as noted above, from the portable electronic device into a computer where the downloaded data may be compared to a database of predetermined data, e.g., serial number of the checkpoint, location of the checkpoint. Suitable programming may analyze the timing of the downloaded data regarding the time at each location.

Thus, while various embodiments of the present invention have been illustrated and described, it will be appreciated to those skilled in the art that many changes and modifications may be made thereunto without departing from the spirit and scope of the invention.

The invention claimed is:

1. A method for use in processing a transaction, the method comprising:
   obtaining data from a portable electronic device by optically scanning a decodable optical indicia displayed on a display of the portable electronic device, the data comprising information obtained using the portable electronic device regarding the transaction, and information obtained using the portable electronic device regarding at least one of a physical location of the portable electronic device when obtaining the information regarding the transaction and a time of the day when obtaining the information regarding the transaction;
   processing the transaction based on the data regarding the information regarding the transaction and the at least one of the information regarding the physical location of the portable electronic device when obtaining the information regarding the transaction and the time of the day when obtaining the information regarding the transaction.

2. The method of claim 1, wherein the providing the data comprises displaying a decodable optical indicia on a display of the portable electronic device in which the decodable optical indicia comprises a first portion associated with the information regarding the transaction, and a second portion regarding information regarding the physical location of the portable electronic device when obtaining the information regarding the transaction.

3. The method of claim 1, wherein the obtaining the information regarding the at least one of the physical location of the portable electronic device and the time of the day comprises obtaining signals from an external positioning system.

4. The method of claim 3, wherein the external positioning system comprises at least one of a global positioning system, a cellular network, and a wireless local area network.

5. The method of claim 1, wherein the providing the data comprises providing the data regarding the time of the day when obtaining the information regarding the transaction, and providing data regarding the physical location of the portable electronic device when obtaining the information regarding the transaction.

6. The method of claim 1, comprising interrogating an RFID tag associated with the transaction.

7. The method of claim 1, wherein:
   the transaction comprises a point-of-sale transaction,
   the obtaining information regarding the transaction comprises obtaining information regarding payment for purchase of a product using the portable electronic device; and
   the providing the data comprises providing the data, at checkout using the portable electronic device, regarding the information regarding payment and at least one of the information regarding the physical location of the portable electronic device and the time of the day.

8. The method of claim 1, wherein:
   the transaction comprises a point-of-sale transaction,
   the obtaining information regarding the transaction comprises obtaining a coupon using the portable electronic device;
   the obtaining information regarding at least one of the physical location of the portable electronic device and a current time of the day comprises at least one of obtaining information regarding the physical location of the portable electronic device when obtaining the coupon, and a time of the day when obtaining the coupon; and
   the providing the data comprises providing the data, at checkout using the portable electronic device, regarding the information regarding the coupon and at least one of the information regarding the physical location of the portable electronic device when generating the coupon and the time of the day when generating the coupon.

9. The method of claim 1, wherein:
   the transaction comprises monitoring a checkpoint;
   the obtaining information regarding the transaction comprises obtaining information regarding the checkpoint using the portable electronic device;
   the obtaining information regarding at least one of the physical location of the portable electronic device and a time of the day comprises at least one of obtaining information regarding the physical location of the portable electronic device at the checkpoint, and a time of the day at the checkpoint; and
   the providing the data comprises providing the data, at a physical location remote from the checkpoint using the portable electronic device, regarding the information regarding the checkpoint and at least one of the information regarding the physical location of the portable electronic device at the checkpoint and the information regarding the time of the day at the checkpoint.

10. A portable electronic device for use in processing a transaction, comprising:

the portable electronic device operable to:

obtain information regarding the transaction;

obtain information regarding at least one of a physical location of the portable electronic device when obtaining the information regarding the transaction, and a time of the day when obtaining the information regarding the transaction;

provide data regarding the information regarding the transaction and the at least one of the information regarding the physical location of the portable electronic device when obtaining the information regarding the transaction and the time of the day when obtaining the information regarding the transaction, for use in processing the transaction; and display the data as a decodable optical indicia on a display of the portable electronic device.

11. The portable electronic device of claim 10, wherein providing data is operable to display the data as a decodable optical indicia on a display of the portable electronic device.

12. The portable electronic device of claim 10, wherein the decodable optical indicia comprises a first portion associated with the information regarding the transaction, and at least one of a second portion associated with information regarding the physical location of the portable electronic device when obtaining the information regarding the transaction, and a third portion associated with information regarding the time of the day when obtaining the information regarding the transaction.

13. The portable electronic device of claim 10, wherein obtaining information relating to the physical location of the portable electronic device when obtaining the information regarding the transaction comprises a receiver for obtaining signals from an external positioning system.

* * * * *